Feb. 9, 1960 W. B. McLEAN 2,924,174
COMBUSTIBLE PRE-SPIN TURBINE FOR SPINNER ROCKETS
Filed Jan. 6, 1954
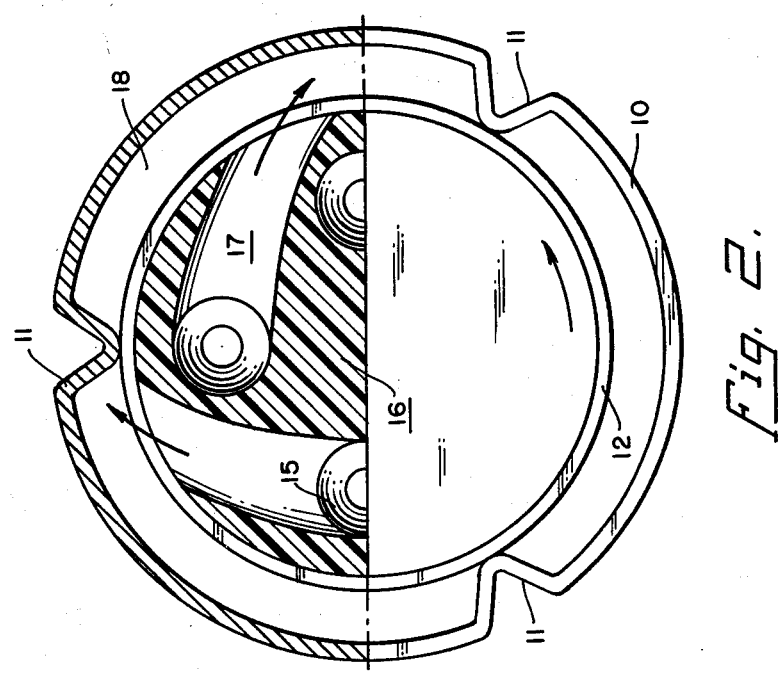
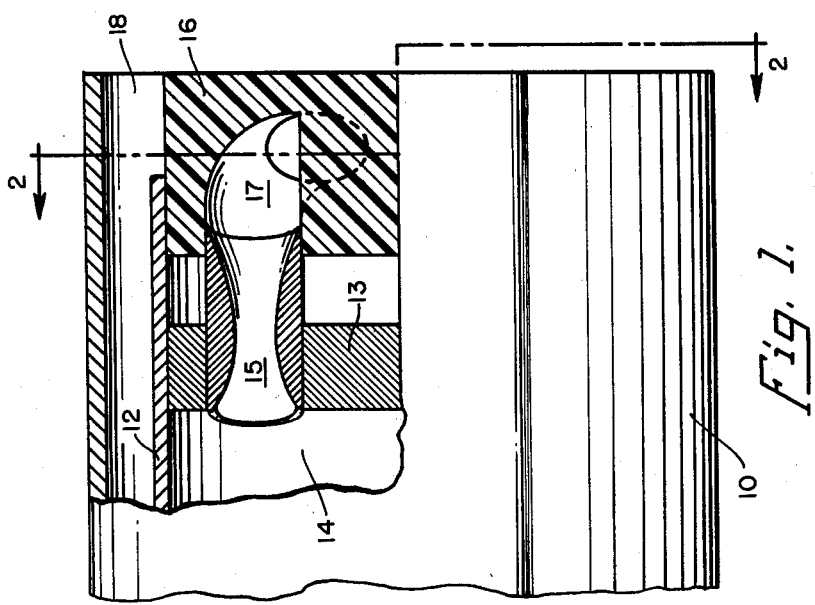
INVENTOR.
WILLIAM B. MC LEAN

United States Patent Office 2,924,174
Patented Feb. 9, 1960

2,924,174

COMBUSTIBLE PRE-SPIN TURBINE FOR SPINNER ROCKETS

William B. McLean, China Lake, Calif.

Application January 6, 1954, Serial No. 402,612

5 Claims. (Cl. 102—49)

(Granted under Title 35, U.S. Code (1952), sec. 266)

The invention described herein may be manufactured and used by or for the Government of the United States of America for governmental purposes without the payment of any royalties thereon or therefor.

The present invention relates to rockets and more particularly to spin-stabilized rockets.

Rockets of the type to which this invention pertains have generally employed radially directed discharge nozzles, for imparting to the rocket a spinning motion about its longitudinal axis for stabilizing the same in flight, in addition to the conventional axial propulsion nozzles, or have utilized propulsion nozzles which were inclined slightly to the longitudinal axis of the rocket whereby to both propel the rocket and impart a spinning motion thereto for stabilizing the same in flight. Such arrangements, however, did not provide for a stable missile at the time of launching owing to the fact that the spin rate was relatively low as the missile left the launcher. Various pre-spinning arrangements have, therefore, been developed in the past, for imparting to the rocket, or to some rotary stabilizing element thereof, prior to launching, a rotational velocity of such magnitude as to cause the missile to be stable at the time it became airborne. Such prior arrangements were, however, excessively complex, costly to manufacture, and required either a complicated launching arrangement, or firing actuation thereof consisted of intricate and time consuming sequential operations involving the ignition of a plurality of powder grains.

The present invention provides a relatively simple spin-stabilized rocket comprising a novel discharge nozzle assembly including a deflector element of combustible material whereby the entire thrust developed by the rocket exhaust gases may be initially directed transversely and substantially tangentially of the rocket for imparting thereto a rapid pre-spinning motion prior to launching, the radial thrust gradually becoming axial as the jet deflectors are consumed by burning whereby the pre-spinning rocket will be propelled from the launching tube under conditions of stable flight.

In accordance with the foregoing it is an object of the present invention to provide a simplified spin-stabilized rocket.

Another object of the invention is to provide a spin-stabilized rocket embodying a novel discharge nozzle assembly for causing the exhaust gases to be initially directed radially of the rocket whereby to impart a pre-spinning motion thereto prior to launching, the thrust gradually becoming axial whereby the pre-spinning rocket will be propelled from the launcher under conditions of stable flight.

A further object of the invention is to provide a spin-stabilized rocket comprising a discharge nozzle assembly including combustible deflector elements for initially directing the exhaust gases radially of the rocket whereby to impart a pre-spinning motion to the rocket prior to flight, the exhaust gas thrust gradually becoming axial as the deflector elements are consumed by burning whereby the pre-spinning rocket will be propelled from the launching tube under conditions of stable flight.

Other objects and many attendant advantages of the present invention will become apparent as the same becomes better understood from the following detailed description had in conjunction with the annexed drawings wherein:

Fig. 1 is a longitudinal view partially in section of the after body of a rocket embodying the present invention, the rocket being shown in its prefiring position within the launching tube; and Fig. 2 is a transverse sectional view taken substantially along the line 2—2 of Fig. 1.

Referring now to the drawings and more particularly to Fig. 1, there is shown at 10 a generally cylindrical launching tube having formed therein a plurality of longitudinally extending, equiangularly spaced indentations 11 (Fig. 2). Positioned within the launching tube 10 and in slidable engagement with the inner surfaces of indentations 11 is a rocket comprising a cylindrical casing 12 having fixed therein a nozzle plate 13 defining the after bulkhead of the combustion chamber 14 and in which plate are fixed a plurality discharge nozzles 15 which may extend axially of the rocket or have their axes slightly inclined relative to the axis of the rocket. Fixedly disposed within the after end of casing 12 is a disk-shaped member 16 of burnable material having formed therein a plurality of passages 17, equal in number to the number of discharge nozzles 15, which open through the forward face of disk element 16 and which are curved so as to extend transversely and substantially tangentially of disk 16. Nozzles 15 are received within the forward ends of passages 17, as shown, and are sealed to disk member 16 so as to provide a gas-tight joint between nozzles 15 and member 16. The radial clearance between casing 12 and tube 10 forms flow spaces 18 for the rocket exhaust gases. Disk member 16 may be formed of an inflammable plastic, propellant composition, or other material whose shape and burning rate can be so adjusted that the entire initial thrust developed by the exhaust gases will be directed radially of the rocket whereby to impart to the latter a pre-spinning motion about its longitudinal axis prior to launching and whose burning rate may be made such that the thrust will become increasingly axial at a desired rate as the deflector burns and erodes under the action of the exhaust gases. Upon the complete burning and erosion of the deflector member 16, only a forward or both a forward and a tangential thrust, depending upon the design of nozzles 15, will be produced. The exhaust gas deflection can be so controlled by varying tne type and thickness of the material comprising the deflector and the contour of the deflector passages as to provide any desired relation between the forward velocity of the rocket and its pre-spin rate.

It will be apparent from the foregoing that the present invention provides a relatively simple spin-stabilized rocket including a unique discharge nozzle and deflector assembly for imparting to the rocket a stabilizing pre-spinning motion about its longitudinal axis prior to its ejection from the launching tube whereby the rocket will be launched under conditions of stable flight. Moreover, owing to the fact that the deflector elements are consumed by burning rather than ejected from the missile after launching, a hazard is not presented to the launching craft or other adjacent craft.

Obviously, many modifications are possible in the light of the above teachings. It is therefore to be understood that within the scope of the appended claims the invention may be practiced otherwise than as specifically described herein.

What is claimed is:

1. A spin-stabilized rocket comprising a plurality of discharge nozzles and a jet deflector element sealed to said nozzles, said jet deflector element including a plurality of passages communicating with said nozzles, said passages extending from said nozzles in substantially helical directions to the outer periphery of said deflector element whereby an initial tangential thrust for imparting a pre-spinning motion to the rocket prior to launching is developed, said deflector being adapted to be consumed at a desired rate by the heat of the exhaust gases whereby the thrust of the exhaust jets will become increasingly axial and the pre-spinning rocket will be propelled from the launcher under conditions of stable flight.

2. A spin-stabilized rocket comprising discharge nozzle means and a jet deflector element of burnable material sealed to said discharge nozzle means, said deflector including passage means communicating with said nozzle means and extending from said nozzle means in a substantially helical direction to the outer peripheral wall of said deflector element, said passage means serving to initially direct the exhaust gases outwardly from said nozzles to impart an initial tangential thrust to said rocket for imparting to the latter a pre-spinning motion prior to launching, said deflector being adapted to be consumed at a desired rate by the heat of the exhaust gases whereby the thrust of the exhaust jet will become increasingly axial.

3. In a spin stabilized rocket of the type having a plurality of angularly spaced and canted nozzles at the rear end thereof through which gases of combustion are adapted to exhaust in certain normal directions and impart spin to the rocket about its longitudinal axis during flight, the combination therewith of spin augmenting means for increasing the spin rate of the rocket during launching thereof, said means comprising, a member secured to the rocket rearwardly of said nozzles having a conduit therein for each nozzle, one end of each conduit being substantially aligned with the opening at the rear of the nozzle with which it cooperates, the conduit thence changing to a substantially helical direction and terminating at the outer edge of the member to effect increased spin over the normal spin attained in the absence of the member, the member being of a material which will be burned by the gases whereby it initially deflects the flow of gas to directions imparting tangential thrust to the rocket and gradually allows the gas flow to return to normal exhaust directions from said nozzles for normal propulsive thrust of the rocket as it is consumed.

4. A spin-stabilized rocket comprising a cylindrical casing, a plurality of axially extending discharge nozzles fixed in the after end of said casing, a disc-shaped jet deflector element of burnable material fixed in said casing rearwardly of said nozzles and sealed thereto, said deflector including a plurality of substantially helical passages communicated with said nozzles and extending through the outer periphery of said deflector for initially developing a tangential thrust for imparting to the rocket a pre-spinning motion prior to launching, the thrust gradually becoming axial as said deflector is consumed by the heat of the exhaust gases whereby the pre-spinning rocket will be propelled from the launcher under conditions of stable flight.

5. A jet deflector for use in a spin-stabilized rocket including a plurality of discharge nozzles, comprising a member of burnable material adapted to be sealed to said nozzles and including a plurality of substantially helical passages communicated with said nozzles and extending through the outer periphery of said member for initially directing the exhaust jets therefrom outwardly of said member whereby to initially develop a tangential thrust for pre-spinning the rocket prior to launching, said deflector being adapted to be consumed by the heat of said jets whereby the thrust will become increasingly axial.

References Cited in the file of this patent
FOREIGN PATENTS 991,228  France ---------------- June 20, 1951